United States Patent
Kim et al.

(10) Patent No.: US 12,362,368 B2
(45) Date of Patent: Jul. 15, 2025

(54) ELECTRODE FOR VANADIUM REDOX FLOW BATTERY AND METHOD FOR MANUFACTURING SAME

(71) Applicant: KOREA ADVANCED INSTITUTE OF SCIENCE AND TECHNOLOGY, Daejeon (KR)

(72) Inventors: Seong Su Kim, Daejeon (KR); Jaemoon Jeong, Daejeon (KR); Kwang Il Jeong, Daejeon (KR); Jaehyung Oh, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 18/422,156

(22) Filed: Jan. 25, 2024

(65) Prior Publication Data

US 2024/0170688 A1    May 23, 2024

Related U.S. Application Data

(63) Continuation of application No. 17/503,552, filed on Oct. 18, 2021, now abandoned.

(30) Foreign Application Priority Data

Oct. 21, 2020 (KR) .......... 10-2020-0136963
Feb. 9, 2021 (KR) .......... 10-2021-0018669

(51) Int. Cl.
*H01M 4/96* (2006.01)
*H01M 4/86* (2006.01)
*H01M 4/88* (2006.01)
*H01M 8/18* (2006.01)

(52) U.S. Cl.
CPC .......... *H01M 4/96* (2013.01); *H01M 4/8875* (2013.01); *H01M 8/188* (2013.01); *H01M 2004/8684* (2013.01)

(58) Field of Classification Search
CPC ...................................... H01M 4/96
See application file for complete search history.

(56) References Cited

U.S. PATENT DOCUMENTS

| | | | |
|---|---|---|---|
| 2015/0072261 A1 | 3/2015 | Mench et al. | |
| 2015/0295247 A1* | 10/2015 | Kumbur | H01M 8/188 29/874 |
| 2019/0260033 A1 | 8/2019 | Kajiwara et al. | |
| 2020/0403248 A1 | 12/2020 | Oya et al. | |

FOREIGN PATENT DOCUMENTS

WO    WO 2013/095380 A1    6/2013

OTHER PUBLICATIONS

U.S. Appl. No. 17/503,552, filed Oct. 18, 2021, Seong Su Kim et al., Korea Advanced Institute of Science and Technology.

* cited by examiner

*Primary Examiner* — Brian R Ohara
(74) *Attorney, Agent, or Firm* — NSIP Law

(57) ABSTRACT

Provided is a method of controlling flow of an electrolyte in a vanadium redox flow battery, comprising: preparing an electrode for the vanadium redox flow battery comprising at least two carbon material-based papers disposed in parallel with each other; and flowing the electrolyte parallel to surfaces of the at least two carbon material-based papers, wherein each of the at least two carbon material-based papers comprises at least one hole pattern.

9 Claims, 9 Drawing Sheets

Related Art

- High $v_f$, 2D Random arrangement
  → Electrolyte Distribution ↓
- Low in-plane permeability
  → Side flow ↑

ELECTRODE FOR VANADIUM REDOX FLOW BATTERY AND METHOD FOR MANUFACTURING SAME

CROSS-REFERENCE TO RELATED APPLICATIONS

This application is a continuation of U.S. patent application Ser. No. 17/503,552 filed on Oct. 18, 2021, which claims the benefit under 35 USC § 119(a) of Korean Patent Application No. 10-2020-0136963 filed on Oct. 21, 2020 and Korean Patent Application No. 10-2021-0018669 filed on Feb. 9, 2021 in the Korean Intellectual Property Office, the entire disclosure of which is incorporated herein by reference for all purposes.

TECHNICAL FIELD

The present disclosure relates to an electrode for a vanadium redox flow battery (VRFB) and a method for manufacturing the same, more particularly to an electrode for a vanadium redox flow battery, which is capable of inducing a uniform electrolyte distribution by forming holes on a carbon material-based paper electrode without manufacturing of a bipolar plate, and a method for manufacturing the same.

BACKGROUND ART

A vanadium redox flow battery (VRFB) is drawing attentions as a next-generation energy storage device because of its advantages that output and energy capacity can be designed independently and it has long lifetime and is safe.

Basically, the vanadium redox flow battery is composed of electrolyte tanks in which vanadium active materials with different oxidation states are stored, pumps for flow regulation of flow rate and circulation, electrodes providing sites for reaction of the active materials, and an ion exchange membrane for separation of the electrodes and transport of hydrogen ions ($H^+$).

Unlike the existing secondary batteries, the liquid electrolytes are stored in external tanks, rather than in cells and are supplied into the cell using pumps during charge/discharge. Because the energy capacity of the battery is determined by the amount of the electrolytes stored in the tanks and its power is determined by the size and number of single cells including the electrodes, the energy capacity and output can be increased or decreased easily. During charging, electrical energy is produced using the redox potential difference of ions in the electrolytes as tetravalent vanadium ion ($VO^{2+}$) is oxidized to pentavalent vanadium ion ($VO_2^+$) at the positive electrode and trivalent vanadium ion ($V^{3+}$) is reduced to divalent vanadium ion ($V^{2+}$) at the negative electrode. During discharging, the change in the oxidation number of the vanadium ions occurs conversely. The chemical reactions occurring during charge/discharge are as follows.

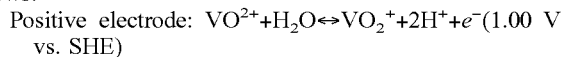
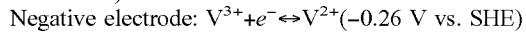

In the vanadium redox flow battery, the electrode is the one of major component. The conventional material of electrode is carbon felt (CF).

FIG. 1 is a micro-CT image of the existing carbon felt.

Referring to FIG. 1, there are two limitations in increasing the energy efficiency of a VRFB using such a carbon felt electrode. First, since the carbon felt has a relatively small fiber volume fraction ($v_f$) of less than 5%, reaction area is small and there is limitation in increasing energy efficiency. In addition, there is a problem that the surface uniformity of the carbon felt is low. In contrast, a carbon material-based paper can be designed to the electrode with high fiber volume fraction, which increases reaction area ($v_f$>20%).

FIG. 2 compares a carbon felt and a carbon material-based paper, and FIG. 3 illustrates the electrolyte behavior of the carbon material-based paper.

Although the carbon material-based paper having a relatively larger reaction area has a great advantage as an electrode as shown in FIG. 2, it has the following disadvantages when used as an electrode as shown in FIG. 3.

First, the carbon paper does not allow uniform flow as an electrode material due to fibers randomly arranged in 2D, and the side flow phenomenon, i.e., flow of the electrolyte outside the electrode, occurs frequently due to low porosity. Therefore, the efforts to improves flow characteristic are necessary. For example, International Patent No. WO2013095380 discloses a carbon paper for a VRFB, including carbon fibers, carbon binder residues and carbon particles disposed on the carbon fibers, wherein the concentration of the carbon particles increases as a function of distance from the flow field plate side of the carbon paper. However, this approach requires special processing of a bipolar plate adjacent to the electrode. For this, channels are formed in a bipolar plate so that most of the electrolyte flows into the channels of the bipolar plate, thereby increasing the reaction area.

In addition, this method results in high cost for the bipolar plate processing and it is difficult to maximize the reaction area by utilizing all the area of the electrode because most of the electrolyte flows along the bipolar plate adjacent to the electrode. Accordingly, a new electrode capable of maximizing the advantages of the carbon paper and inducing uniform electrolyte distribution without special processing of the bipolar plate, and a method for manufacturing the same are necessary.

DISCLOSURE

Technical Problem

The present disclosure is directed to providing a new electrode capable of inducing uniform electrolyte distribution without special processing of a bipolar plate such as formation of a flow channel in a vanadium redox flow battery, and a method for manufacturing the same.

Technical Solution

The present disclosure provides an electrode for a vanadium redox flow battery, having a structure in which at least two carbon material-based papers are stacked, wherein the carbon material-based paper includes at least one hole pattern.

In an exemplary embodiment of the present disclosure, the hole pattern of the at least two carbon material-based papers has an arranged structure and, through this, the direction of electrolyte flow of the electrode is determined by the direction of the hole pattern.

In an exemplary embodiment of the present disclosure, the hole pattern of the at least two carbon material-based papers have an arranged structure, and the hole pattern of the carbon material-based paper electrodes has holes at regular intervals for increased substantial specific surface area of reaction and decreased flow loss.

In an exemplary embodiment of the present disclosure, the carbon material-based paper has a plurality of line patterns with a V-shaped cross-section along a flow direction.

In an exemplary embodiment of the present disclosure, the carbon material-based paper has a micro sized thickness, the carbon paper has a compressibility of 0-40%, and the carbon material-based paper is in the form of a paper including carbon materials and includes at least one selected from a group consisting of carbon paper and bucky paper.

The present disclosure also provides a method for manufacturing an electrode for a vanadium redox flow battery, which includes: a step of forming a hole pattern in a carbon material-based paper; and a step of stacking the carbon material-based paper with the hole pattern formed.

In an exemplary embodiment of the present disclosure, the method for manufacturing an electrode for a vanadium redox flow battery may further include, after the step of forming the hole pattern in the carbon material-based paper, a step of removing impurities produced during the formation of the hole pattern. In an exemplary embodiment of the present disclosure, the hole pattern may be formed by at least one selected from a group consisting of plasma processing, laser processing, CNC processing and needle punching.

In an exemplary embodiment of the present disclosure, the plasma processing may be performed by forming a hole pattern on the carbon material-based paper with activated gas ion using a masking plate having the hole pattern.

In an exemplary embodiment of the present disclosure, the carbon material-based paper may be surface-treated at the same time as the hole pattern is formed by the plasma processing.

In an exemplary embodiment of the present disclosure, the step of removing impurities produced during the formation of the hole pattern may be performed by at least one selected from a group consisting of dip cleaning, spray cleaning, ultrasonic cleaning, compressed air spraying and vacuum cleaning.

The present disclosure also provides a vanadium redox flow battery including an electrode for a vanadium redox flow battery, and an energy storage system including the same.

Advantageous Effects

According to the present disclosure, a pseudo-channel effect is induced in a VRFB by stacking a carbon material-based paper with a pattern formed. Accordingly, a carbon material-based paper according to the present disclosure has the advantage that specific surface area can be increased through uniform distribution of electrolyte in the electrode while maintaining electrochemical properties by minimizing mass loss of the electrode caused by channel processing. In addition, the overpotential inside the electrode can be reduced by preventing flow of the electrolyte outside the electrode, and the designing of a system having high energy efficiency and discharge capacity becomes possible. In addition, since the stacked carbon material-based paper has a micro sized thickness, a stacked electrode having adequate compressibility can be designed easily by adjusting the number of the stacked papers, and the size, weight and manufacturing cost of a VRFB system can be reduced greatly since processing of flow channels on a bipolar plate is unnecessary. Furthermore, surface treatment and channel formation can be achieved with a single process by forming holes through plasma processing.

BEST MODE

Hereinafter, an electrode according to the present disclosure for a vanadium redox flow battery and a method for manufacturing the same will be described referring to the attached drawings. Unless specially defined otherwise, all the terms used in the present specification have the same meanings as those generally understood by those having ordinary knowledge in the art to which the present disclosure belongs. If the meanings are contradictory, the definition in the present specification shall apply. In addition, detailed descriptions of well-known features and configurations will be omitted to unnecessarily obscuring the present disclosure. Throughout the specification, when a portion is described to "include" a specific element, it does not mean that another element is excluded but means that there may be another element, unless specially stated otherwise.

In order to develop a carbon electrode that can replace the carbon felt widely used as an electrode of the existing VRFB, the present disclosure provides an electrode structure having holes using a carbon material-based paper, and a method for manufacturing the same.

Figure 1:
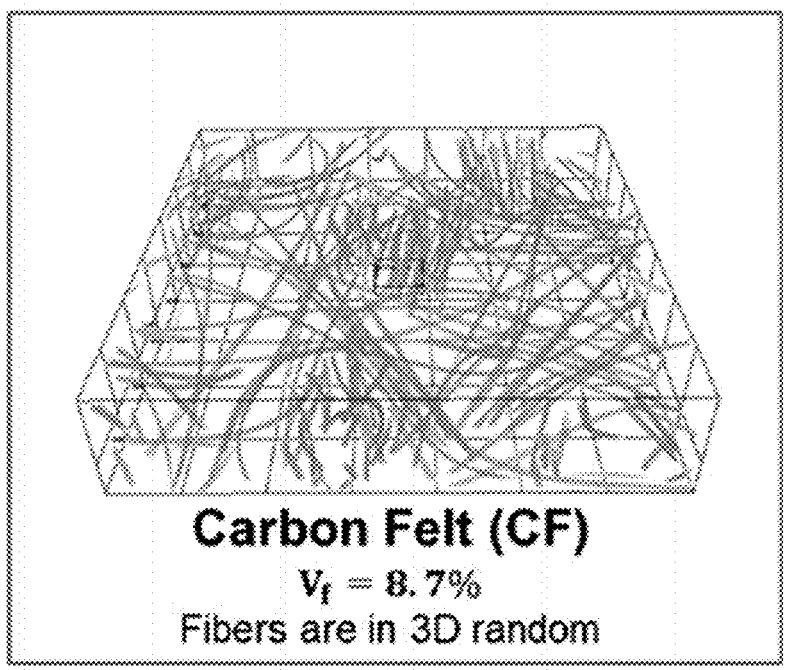
FIG. 1 is a schematic view of the existing carbon felt.
Figure 2:
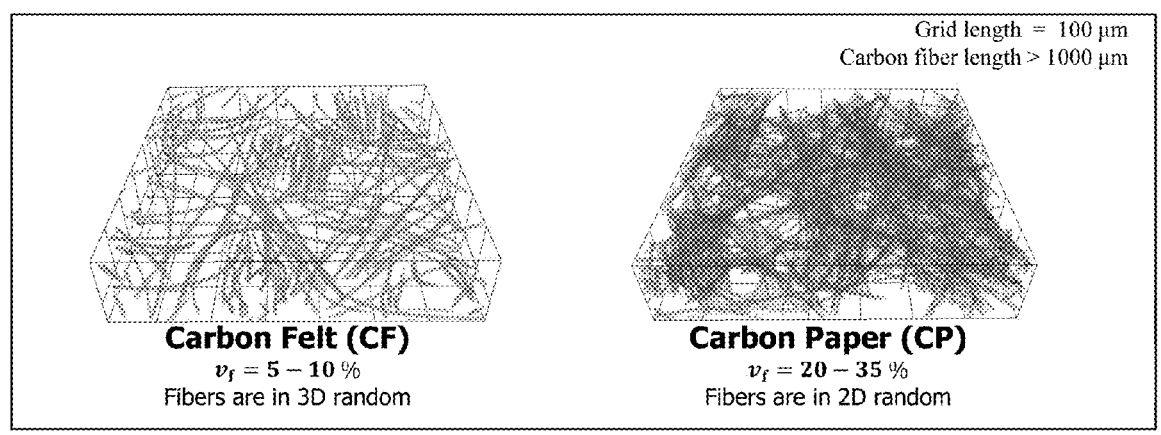
FIG. 2 compares a carbon felt with a carbon paper.
Figure 3:
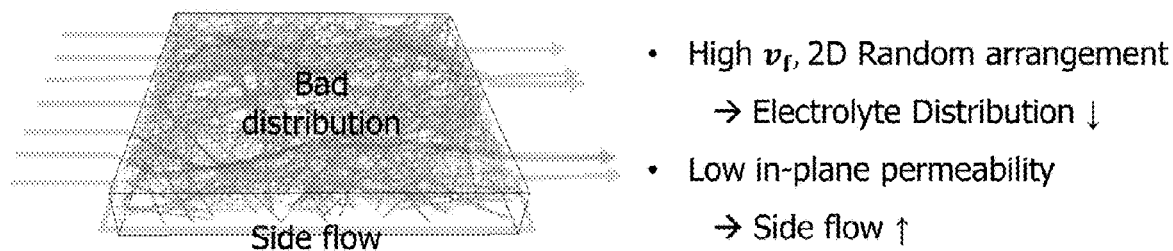
FIG. 3 illustrates fluid flow in a carbon paper.
Figure 4:
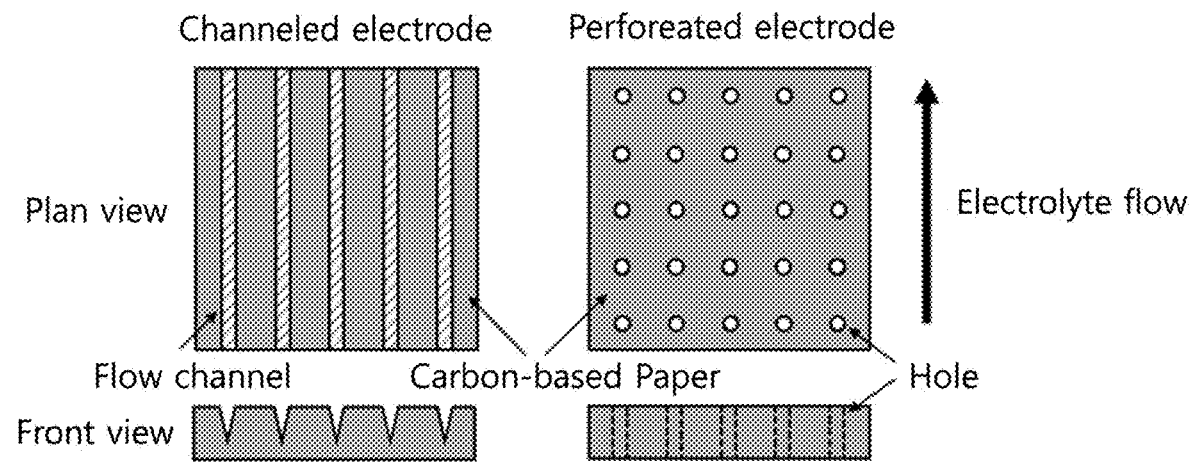
FIG. 4 shows plan views and cross-sectional views of the existing channel-processed electrode and a hole-processed electrode according to the present disclosure.

FIG. 4 shows plan views and cross-sectional views of the existing channel-processed electrode and a hole-processed electrode according to the present disclosure.

Referring to FIG. 4, the channel-processed electrode on the left side has the advantage that the channels formed along a flow direction improve the dispensing of distribution of an electrolyte in the electrode and decrease flow resistance. But, the channel-processed electrode has the disadvantage that reaction area and electrical conductivity are decreased due to excessive mass loss, which also results in deteriorated mechanical property. In addition, reaction area is decreased further because most of the electrolyte flows via the channels having low flow resistance rather than passing through the electrode.

In contrast, the hole-processed electrode on the right side has holes processed to provide uniform flow. The carbon material-based paper has a pattern in which holes are formed with regular intervals, and the carbon material-based paper is stacked to be used as a VRFB electrode. When holes with a dimeter of 0.3 mm or greater are formed with regular intervals of 5 mm or smaller, the electrode presented in the present disclosure exhibits a pseudo-channel effect in which electrolyte flow along the hole pattern direction can be induced without forming continuous channels along the flow direction. When the hole diameter is 1 mm or smaller, superior electrical conductivity and reactivity can be achieved due to insignificant mass loss. Uniform electrolyte flow may be induced by varying the diameter of the holes along the electrolyte flow direction in consideration of the battery structure. In addition, concentration loss may be minimized by varying the diameter of the holes along the thickness direction of the electrode.

Figure 5:
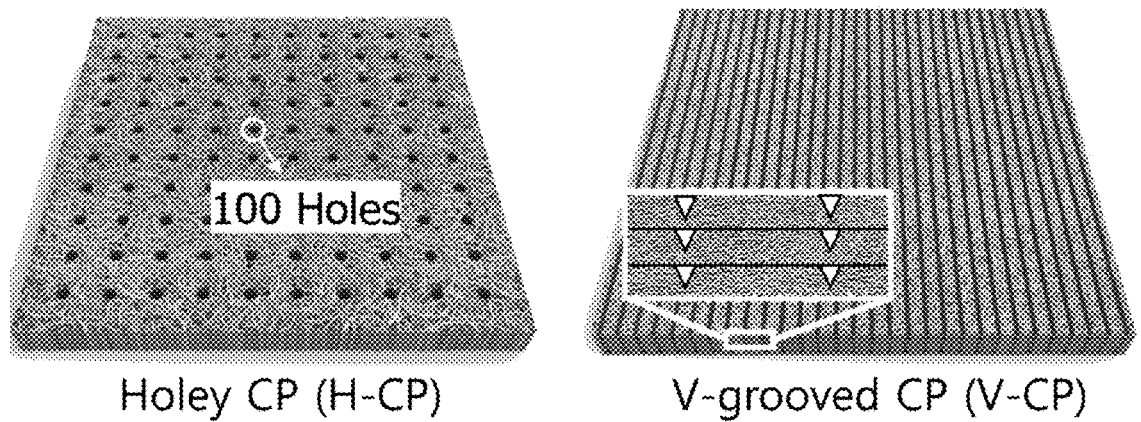
FIG. 5 schematically shows a carbon material-based paper electrode manufactured according to an exemplary embodiment of the present disclosure.

FIG. 5 schematically shows a carbon material-based paper electrode manufactured according to an exemplary embodiment of the present disclosure.

An electrode having holes formed is shown on the left side in FIG. 5. The holes may be formed in a V-shaped line pattern.

Alternatively, a carbon material-based paper electrode in which a plurality of lines with V-shaped cross-sections are patterned without holes may be used, which is also included in the scope of the present disclosure.

The V-shaped channels formed with regular intervals in a direction parallel to the flow direction may increase electrolyte flow into the electrode rather than flow of the electrolyte outside the electrode, and may provide uniform distribution of the electrolyte.

Figure 6:
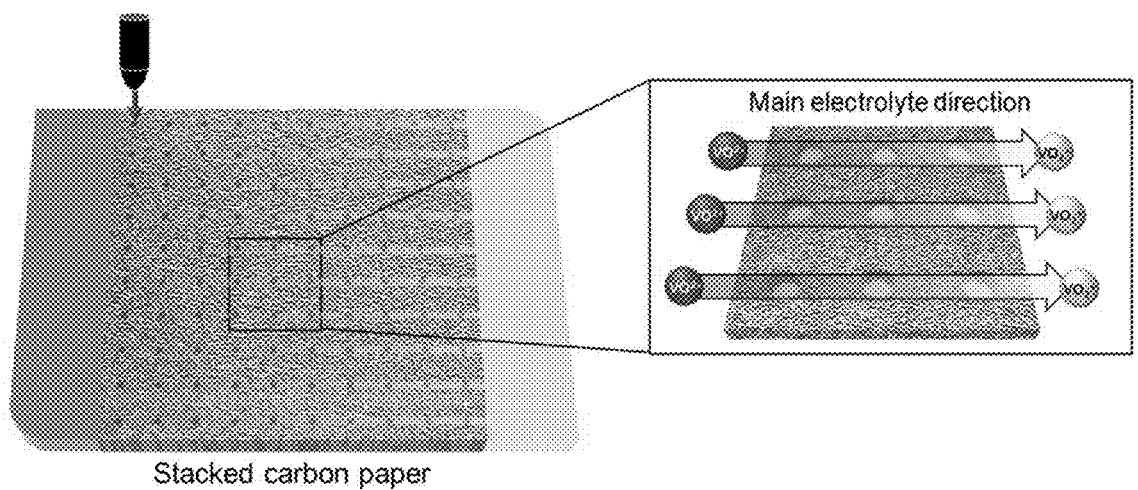
FIG. 6 is a schematic view of an electrode for a vanadium redox flow battery manufactured according to an exemplary embodiment of the present disclosure.

FIG. 6 is a schematic view of an electrode for a vanadium redox flow battery manufactured according to an exemplary embodiment of the present disclosure.

Referring to FIG. 6, in an electrode wherein a hole pattern is formed with a regular interval and size, the electrolyte flows along the direction of the patterned holes and, especially, uniform flow can be induced without formation of an additional channel pattern.

That is to say, the electrode according to the present disclosure and the method for manufacturing the same are advantages in that, firstly, the hole-processed electrode can maximize the flow through the electrode by minimizing mass loss while maintaining electrochemical properties, as compared to the channel-processed electrode. Secondly, specific surface area is increased as uniform distribution of the electrolyte can be induced via channel effect while reducing side flow and, thus, performance can be maximized. This can lead to increased overall energy efficiency by increasing the area for reaction and material exchange and, thereby, improving the voltage efficiency of the redox flow battery. Thirdly, it makes it easier to design a stacked electrode having appropriate compressibility (0-40%) by adjusting the stacking number of carbon material-based papers having a microsized thickness. In addition, the size, weight and manufacturing cost of the VRFB system can be reduced greatly since processing of flow channels on a bipolar plate is unnecessary.

Figure 7:
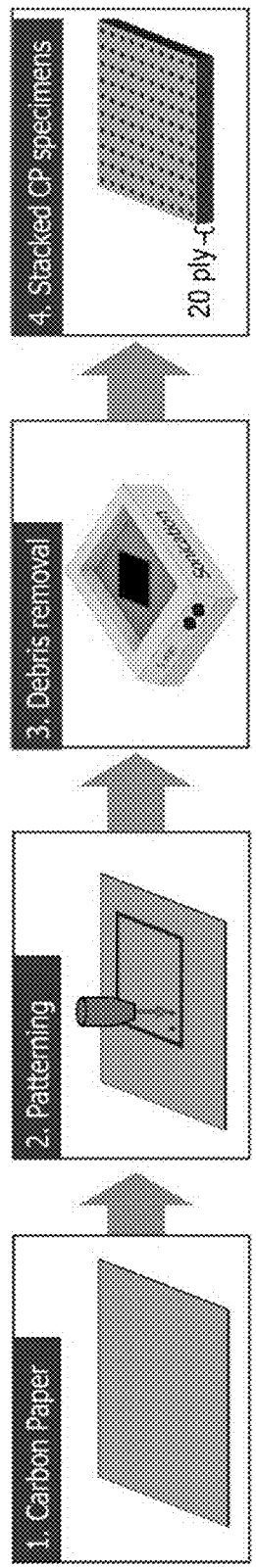
FIGS. 7 and 8 show a schematic view and a flow diagram of a method for manufacturing a carbon material-based paper electrode according to an exemplary embodiment of the present disclosure, respectively.
Figure 8:
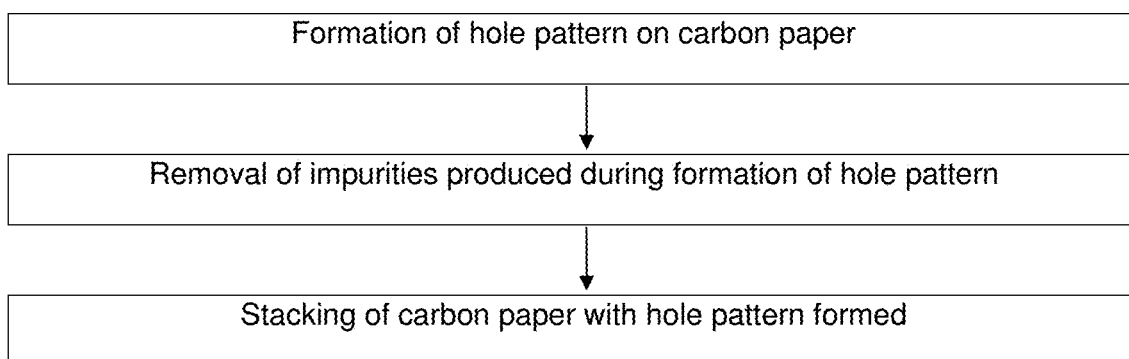

FIGS. 7 and 8 show a schematic view and a flow diagram of a method for manufacturing a carbon material-based paper electrode according to an exemplary embodiment of the present disclosure, respectively.

Referring to FIGS. 7 and 8, a method for manufacturing a carbon material-based paper electrode according to an exemplary embodiment of the present disclosure includes: a step of forming a hole pattern in a carbon material-based paper; and a step of stacking the carbon material-based paper with the hole pattern formed. The method for manufacturing an electrode for a vanadium redox flow battery may further include, after the step of forming the hole pattern in the carbon material-based paper, a step of removing impurities produced during the formation of the hole pattern.

In an exemplary embodiment of the present disclosure, the hole pattern may be formed by at least one selected from a group consisting of plasma processing, laser processing, CNC processing and needle punching.

In addition, the impurities produced during the formation of the hole pattern may be removed by at least one selected from a group consisting of dip cleaning, spray cleaning, ultrasonic cleaning, compressed air spraying and vacuum cleaning.

In an exemplary embodiment of the present disclosure, the carbon paper has a thickness of 200 μm and a basis weight ($g/m^2$) of 50 g, and 20-ply carbon paper is compressed to 25%, although the scope of the present disclosure is not limited thereto.

In another exemplary embodiment of the present disclosure, the holes may be formed by plasma processing rather than by mechanical processing such as CNC processing or needle punching.

The formation of patterned holes using plasma is achieved by introducing a patterned masking layer and may induce active flow through the holes by providing many functional groups (hydroxyl group, carboxyl group, etc.) around the holes. As a result, higher channel effect can be achieved.

In particular, the plasma processing may be performed under the condition of a reactive gas such as oxygen and, etc., and oxygen may be adsorbed to the electrode surface for activation. In this case, the degree of surface treatment may be controlled by adjusting the concentration and pressure of the reactive gas and voltage, and this enables optimized electrode surface.

Figure 9:
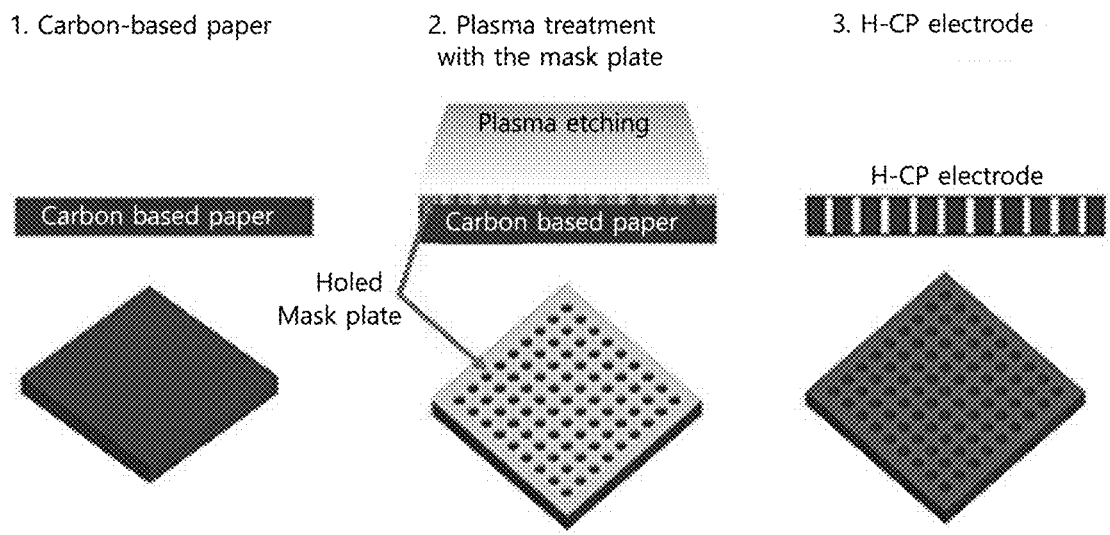
FIG. 9 is a schematic view showing formation of a hole pattern on a carbon paper through plasma processing.

FIG. 9 is a schematic view showing formation of a hole pattern on a carbon paper through the plasma processing.

Referring to FIG. 9, after placing a carbon paper and a masking plate with a hole pattern in a plasma chamber, voltage is applied to the plasma chamber for activation of gas. The activated gas ion is accelerated by the voltage and is adsorbed onto or etches the surface of a target material. A material having enough resistance to the activated gas ion is used as the masking plate, and the activated gas passes only through the patterned portion of the masking plate.

The impurities produced during the formation of the hole pattern is removed by at least one selected from a group consisting of dip cleaning, spray cleaning, ultrasonic cleaning, compressed air spraying and vacuum cleaning.

The present disclosure also provides a vanadium redox flow battery including the electrode for a vanadium redox flow battery described above, and an energy storage system including the same.

Figure 10:
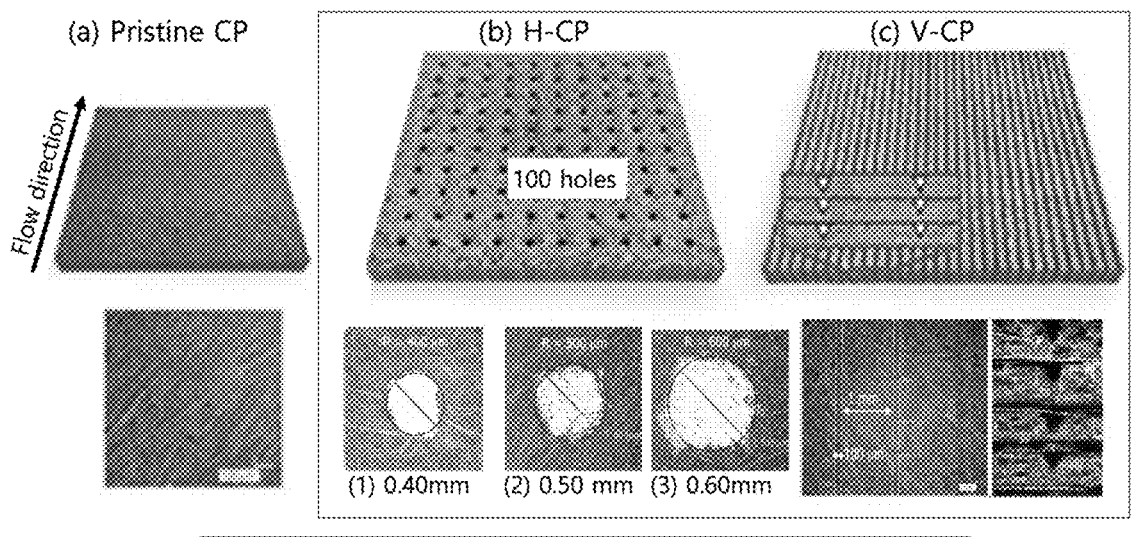
FIG. 10 shows the images of two types of electrodes according to the present disclosure, i.e., a channel-processed electrode (V-CP) and a hole-processed electrode (H-CP) and a result of analyzing electrical resistance and volume.

FIG. 10 shows the images of two types of electrodes according to the present disclosure, i.e., a channel-processed electrode (V-CP, comparative example) and a hole-processed electrode (H-CP, example) and a result of analyzing electrical resistance and volume.

Referring to FIG. 10, it can be seen that the volume loss as compared to a pristine carbon paper (CP) is less than 2% for both the comparative example and the example, and the comparative example and the example show similar surface resistance.

Figure 11:
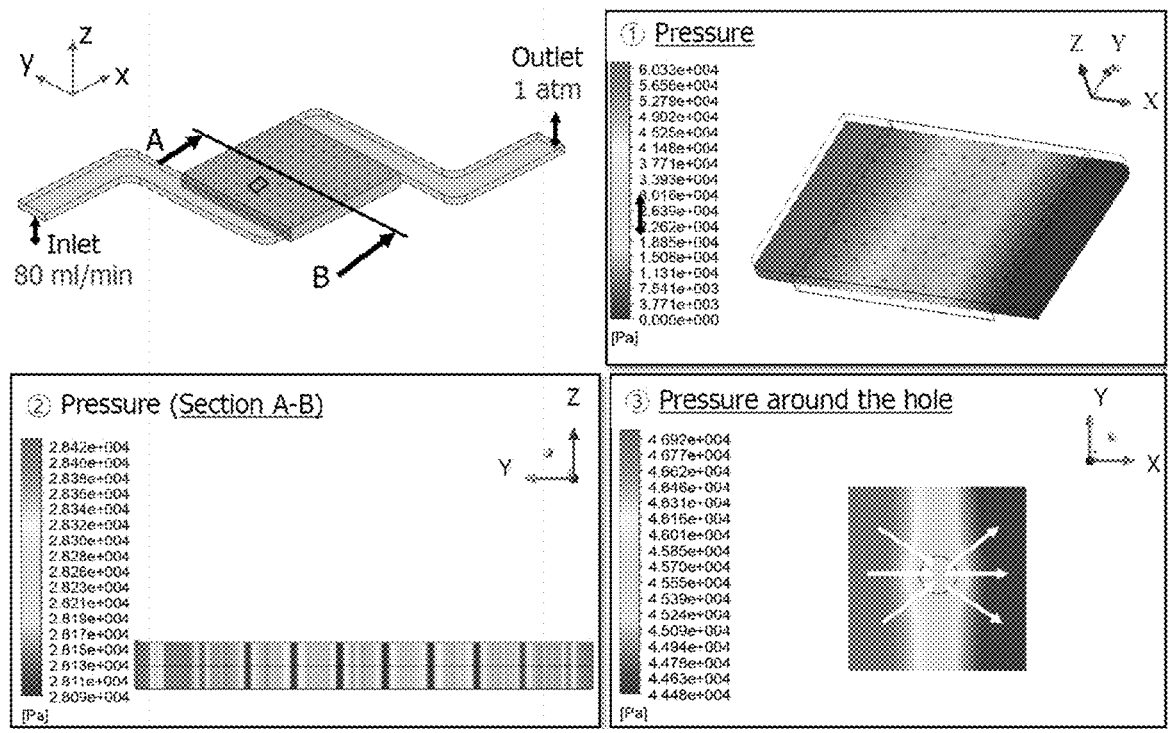
FIG. 11 shows a simulation result of electrolyte flow.
Figure 12:
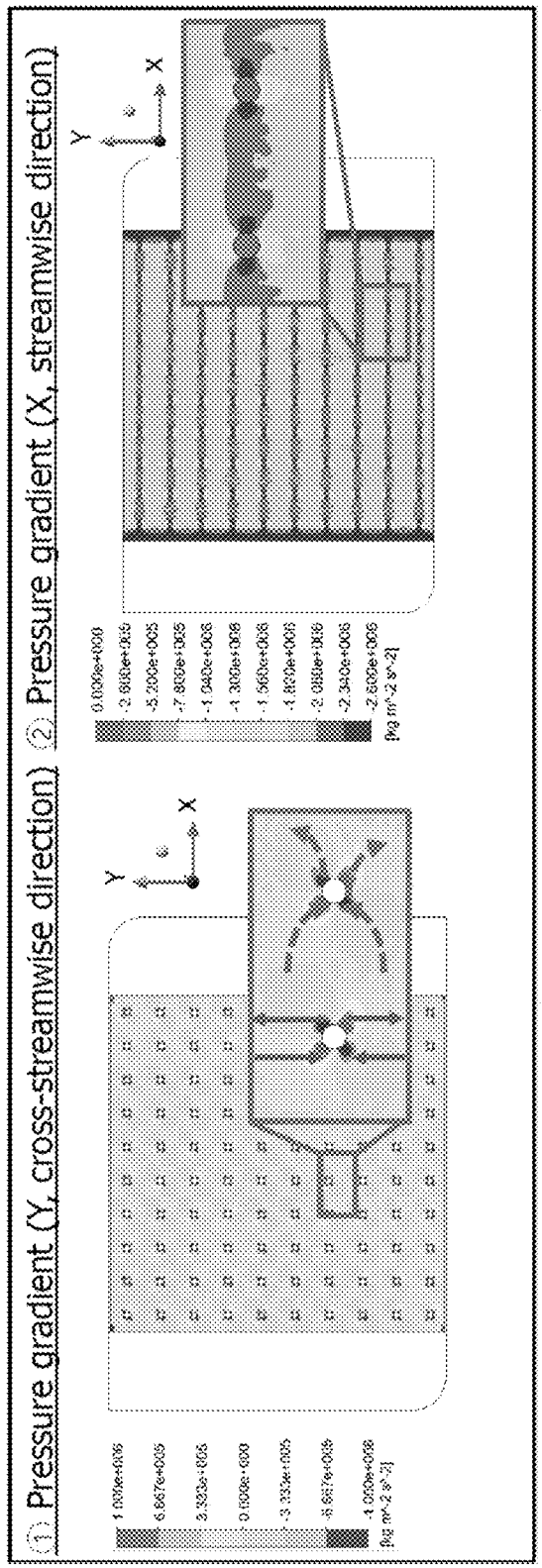
FIG. 12 illustrates the channel effect of an electrode according to the present disclosure.

FIG. 11 shows a simulation result of electrolyte flow, and FIG. 12 illustrates the channel effect of an electrode according to the present disclosure.

Referring to FIG. 11, it can be seen that, when an electrolyte flows, the pressure of the electrolyte seen along the cross-section A-B is relatively lower at the electrode portion than at the holes. As a result, pressure gradient is formed around the holes on the xy-plane, as shown in FIG. 11.

Referring to FIG. 12, the electrolyte at the end of the hole converges toward the hole due to the pressure gradient along the y-axis, and the flow is broadened as it passes through the hole. In addition, once the electrolyte enters the hole, the flow is affected by the pressure gradient along the x-axis.

As a result, most of the electrolyte flows through the holes despite the absence of channels through which the electrolyte can flow along the flow direction. This effect is called pseudo-channel effect in the present disclosure.

In another exemplary embodiment of the present disclosure, patterned lines may be used together with the hole pattern inducing the pseudo-channel effect to maximize the induced flow. The channel may have any cross-section including V-shaped and U-shaped cross-sections, and the scope of the present disclosure is not limited thereby.

Figure 13:
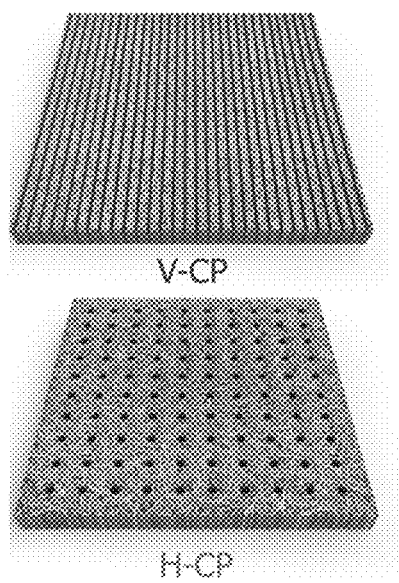
FIG. 13 illustrates the energy efficiency of an electrode according to the present disclosure.
Figure 13:
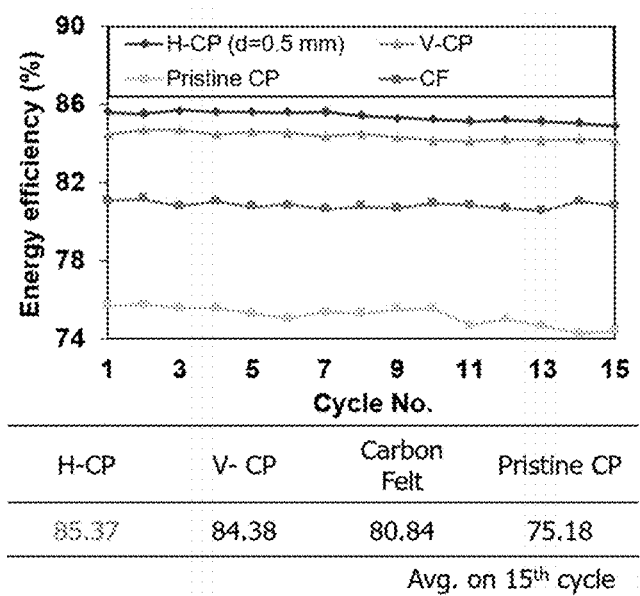

FIG. 13 illustrates the energy efficiency of an electrode according to the present disclosure.

Referring to FIG. 13, it can be seen that the electrode efficiency of an electrode having holes or an electrode in which channels are formed for uniform electrolyte distribution is higher by 8.9% and 9.8%, respectively, as compared to a pristine CP sample with no pattern. The efficiency is even better than that of a commercially available carbon felt. The sample having holes (H-CP) has higher efficiency than the sample having V-shaped lines (V-CP) because, for the H-CP, most of the flow is reactive flow rather than meaningless flow.

The electrode including a carbon material-based paper having hole patterns according to the present disclosure may be used as a vanadium redox flow battery, which, in turn, can be used for an energy storage system (ESS).

Accordingly, a vanadium redox flow battery using the electrode described above and an energy storage system (ESS) using the same are included in the scope of the present disclosure.

While specific exemplary embodiments of the present disclosure have been described in detail, it will be obvious to those having ordinary knowledge in the art that they are only preferred examples and the scope of the present disclosure is not limited by them. Accordingly, it is to be appreciated that the substantial scope of the present disclosure is defined by the appended claims and their equivalents.

The invention claimed is:

1. A method of controlling flow of an electrolyte in a vanadium redox flow battery comprising:
    preparing an electrode for the vanadium redox flow battery comprising at least two carbon material-based papers disposed in parallel with each other; and
    flowing the electrolyte parallel to surfaces of the at least two carbon material-based papers,
    wherein each of the at least two carbon material-based papers comprises at least one hole pattern, and
    wherein a plasma processing is performed by forming the at least one hole pattern on the at least two carbon material-based papers with activated gas ion using a masking plate having the at least one hole pattern.

2. The method claim 1, wherein the at least one hole pattern is disposed on the surfaces of the at least two carbon material-based papers with a depth perpendicular to a direction of the flow of the electrolyte.

3. The method of claim 1, wherein each of the at least two carbon material-based papers comprises a plurality of patterned lines.

4. The method claim 3, wherein each of the plurality of patterned lines has a V-shaped cross-section with a depth perpendicular to a direction of the flow of the electrolyte.

5. The method of claim 1, wherein the at least one hole pattern comprises a plurality of holes at regular intervals with a depth perpendicular to a direction of the flow of the electrolyte.

6. The method of claim 1, wherein each of the at least two carbon material-based papers has a micro sized thickness and a compressibility of 0-40%.

7. The method of claim 1, wherein each of the at least two carbon material-based paper is in a form of a paper comprising carbon materials and comprises at least one selected from the group consisting of carbon paper and buck paper.

8. The method of claim 1, wherein the at least one hole pattern is formed by at least one selected from the group consisting of plasma processing, laser processing, CNC processing and needle punching.

9. The method of claim 1, wherein the at least two carbon material-based papers are surface-treated at the same time as the at least one hole pattern is formed by the plasma processing.

* * * * *